July 3, 1934.   K. E. STUART   1,964,775
APPARATUS FOR PROPORTIONAL DETERMINATION
Filed Dec. 7, 1932

INVENTOR.
Kenneth E. Stuart

Patented July 3, 1934

1,964,775

UNITED STATES PATENT OFFICE 1,964,775

APPARATUS FOR PROPORTIONAL DETERMINATION

Kenneth E. Stuart, Merion, Pa., assignor to Hooker Electrochemical Company, Niagara Falls, N. Y., a corporation of New York Application December 7, 1932, Serial No. 646,136

8 Claims. (Cl. 137—166)

The object of my invention is to simplify the quantity and quality determination of liquid products, such as those from chemical industries, and more particularly in cases where determination of yield efficiency requires accurate sampling and weighing and in which the daily tonnage is inconveniently large for weighing the whole. This object is accomplished by dividing the stream by means of orifices or nozzles into a number of equal parts, sub-dividing one of the resultant streams and repeating this process in as many series as desired. Thus a sample is obtained bearing the ratio $1/n1 \times 1/n2 \times 1/n3$, etc., to the whole, $n1$, $n2$ and $n3$ being the number of equal parts into which each stream is divided.

I am aware that an analogous method has been proposed for quality determination, but the apparatus used has not been suitable for quantity determination. Thus, in a characteristic instance orifices are provided in concentric circles with the sampling orifice at the center and of different form from the others. In such an arrangement the factor is not a constant but varies with the flow, due to the fact that it is affected by the head and by swirls and other disturbing causes. In my invention, on the other hand, the orifices are equidistant from each other and arranged in a circle, with the point of infeed at the center, the sampling orifice being any one of the number and exactly like the rest. Thus all are affected alike by any disturbances. My invention further resides in a particular construction of the orifices such that they will normally have exactly the same diameter even though made with only ordinary care.

Referring to the drawing.

Figures 1, 2:
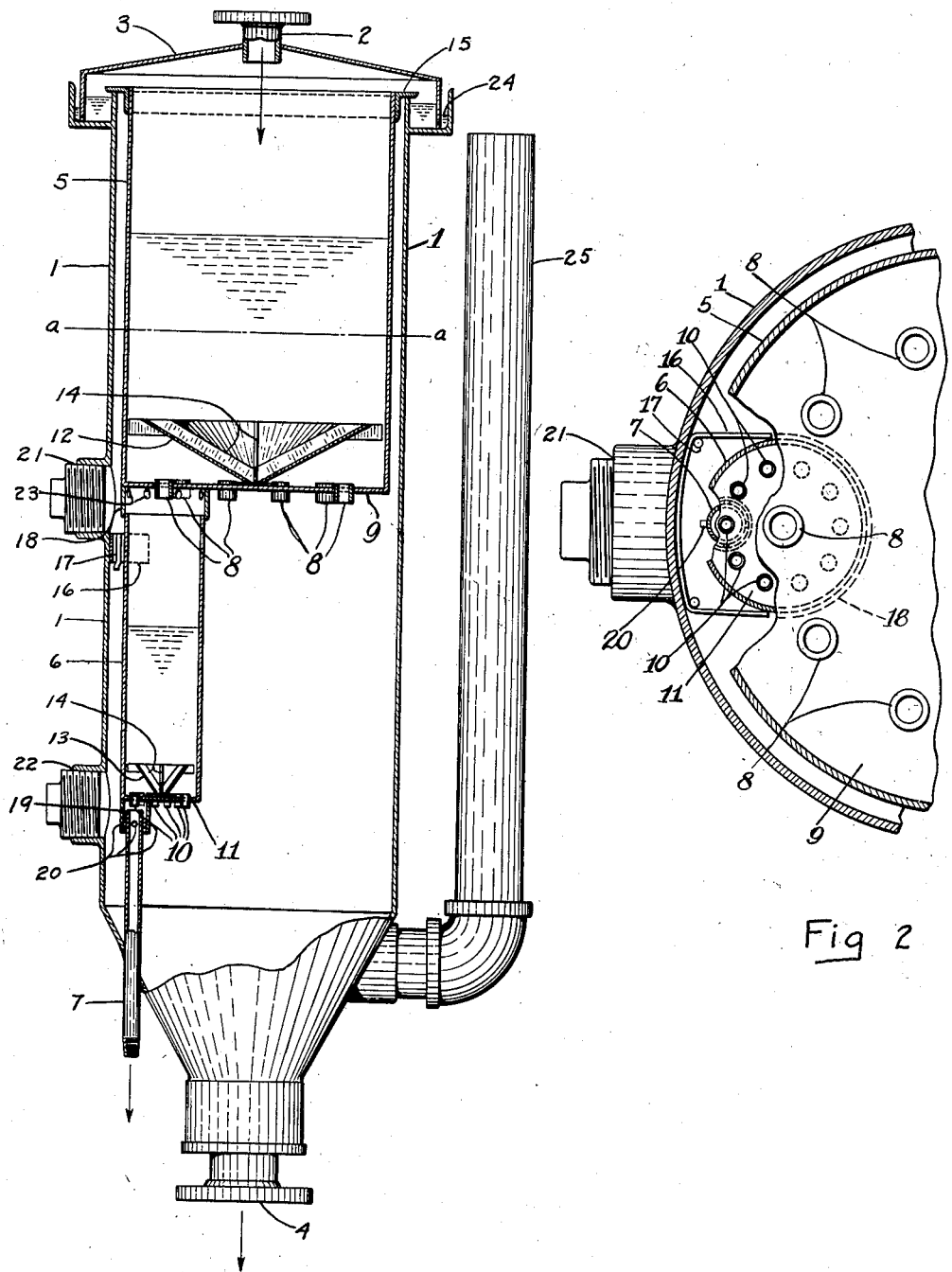
Fig. 1 is a vertical sectional elevation of apparatus embodying my invention.
Fig. 2 is a horizontal sectional view on an enlarged scale taken on line $a$—$a$ of Fig. 1 with parts broken away to show the construction beneath.

In the embodiment shown in the drawing a cylindrical steel shell 1 forms a part of the main conduit and receives the flow through the opening 2 of the removable cover 3 and discharges it through the main outflow 4 at the bottom.

Within the shell 1 are a series of removable vessels 5 and 6, 5 receiving the inflow from the intake 2 and discharging into the interior of the main conduit 1 with a by-pass of a small part of the flow into the vessel 6, which in turn divides this by-passed flow and discharges part of it through the tube 7 to be gauged or weighed and used as a typical sample of the liquid flow.

To establish a definite invariable relation between the quantity of the main flow and the by-passed sample, each vessel 5 and 6 is provided with a number of outlet orifies, ten for instance. In each vessel the orifices are of exactly equal size, but the orifices of vessel 6 are smaller than those of vessel 5. Nine orifices of each vessel discharge into the main outlet 4 and the remaining orifice into the by-pass, so that the flow into vessel 6 is one tenth of the total and the flow into the tube 7 one tenth of one tenth, or one one-hundredth of the total. The outlet orifices 8 in the bottom plate 9 of the vessel 5 are so sized with relation to the volume of the inflow as to hold a quantity of the liquid in the vessel 5 and place each orifice 8 under the same pressure head. Consequently ten equal discharge jets are formed from the vessel 5, nine discharging into the main casing 1 and one into the vessel 6.

Similarly the ten orifices 10 in the bottom 11 of the vessel 6 are sized to maintain a level of liquid in the vessel 6 so as to place all the orifices 10 under the same pressure head. There are therefore ten equal jets, with one discharging into the tube 7 and the others returned to the main flow and passed out through the discharge 4.

The orifices are preferably formed by pressing or screwing into holes in the bottoms of the vessels short tubular nozzles. The nozzles of any one series may all be cut from a single length of seamless drawn tube, thus ensuring that they shall be of exactly equal diameter without the necessity for accurate reaming.

12 and 13 are conical baffles provided with ribs 14 an resting upon the bottoms 9 and 11 of the vessels 5 and 6 respectively. These baffles are centered in the vessels by radial lugs as shown. The purpose of these baffles is to dampen swirls and prevent entrained air from being drawn through the orifices by diverting the flow upward and giving time for the air to rise to the surface before the flow passes over the edge of the cone on its way to the orifices.

The vessel 5 rests on its flange 15. The vessel 6 is supported by the strap 16 which engages the hooks 17, its upper end projecting within the hood 18 which is part of the vessel 5 and concentric with its sampling orifice. The lower end of the vessel 6 is held in position by the hood 19 which is part of the vessel 6 and concentric with its sampling orifice. The hood 19 is centered upon the tube 7 by the pins 20 which project radially from the upper end of the tube 7.

21 and 22 are peep holes provided for the purpose of facilitating the assembly of the vessels 5 and 6 within the shell 1.

23 are vent holes in the hood 18 to prevent a partial vacuum or back pressure from being formed in the vessel 6 and thus affecting the rate of flow through the sampling orifice of the vessel 5. Clearance between the hood 19 and tube 7 performs the same office in the case of the sampling orifice of the vessel 6. The hood 19 further serves to prevent the liquid from orifices other than the sampling orifice from finding its way into the tube 7.

24 is a water seal provided for the purpose of preventing air from being drawn through the shell 1 along with the liquid and causing evaporation, which in the case of aqueous solutions would cause an accumulation of salts within the shell 1.

25 is a vent pipe provided for the purpose of satisfying the vacuum that would otherwise be caused within the shell 1 by the withdrawal of entrained air with the liquid flowing out at 4. The point at which this air is introduced through this vent is washed by the main stream so that no salt can accumulate there.

The quantity of liquid flowing can thus be determined from the sample, either volumetrically or by weight, and if the liquid contains a salt in solution by analysis of the sample the total quantity of salt can be determined. This method gives a more representative sample than can be obtained by dipping out a small quantity from a large storage and it reduces the quantity to be measured or weighed to a small fraction of the whole. The measuring is thus much facilitated or if a weight determination is desired it can be performed upon a more accurate scale of moderate capacity. If the liquid is hot and on its way to an evaporation stage only the heat of a negligible fraction need be lost in the weighing operation, since 99 per cent goes through the apparatus without appreciable delay.

In the system of my invention only twenty orifices are required to produce a 1/100 sample or thirty orifices to produce a 1/1000 sample. If a single series were used it would be impossible to obtain the same degree of accuracy, because 100 orifices could not be cut from a single piece of tube and if a reamer were used wear of the tool in reaming 100 or 1000 holes would be considerable, which would result in a corresponding variation in the orifices. It will be noted that the arrangement of the orifices is perfectly symmetrical. All the orifices of each series are arranged in a single circle concentric with the wall of the vessel and with the point of inflow of the liquid. With this arrangement, all the orifices are affected alike by eddy currents and since they are all of equal diameter and length, if they are placed at the same level they will divide the flow equally, whatever the head upon them. The multiplication factor will therefore be independent of the head and hence a constant for all rates of flow within the capacity of the apparatus. Moreover, it may be predetermined by merely multiplying together the number of orifices in each of the respective series.

In Fig. 1 the liquid level has been indicated but no attempt has been made to indicate the streams, as this would confuse the details of the apparatus itself.

What I claim is:

1. An apparatus for separating out from a variably flowing liquid a constant proportion thereof for measurement comprising a cylindrical vessel, a plurality of like circular orifices in the level bottom thereof, said orifices equally spaced around the circumference of a single circle concentric with the wall of said vessel and the point of inflow of said liquid means for reducing turbulence in said liquid near said orifices and means for diverting the stream from one of said orifices for measurement.

2. An apparatus for separating out for measurement a constant precalculable proportion of a variably flowing liquid comprising a cylindrical vessel, a plurality of like circular orifices in the bottom thereof, said orifices placed at the same level and equally spaced around the circumference of a single complete circle concentric with the wall of said vessel and with the point of inflow of said liquid means for reducing turbulence in said liquid near said orifices and means for diverting the stream from one of said orifices for measurement.

3. An apparatus for separating out from a flowing liquid of variable volume a constant precalculable proportion thereof for measurement comprising a cylindrical vessel, a plurality of orifices of equal length and diameter in the level bottom thereof, said orifices equally spaced around the circumference of a single circle concentric with the wall of said vessel and with the point of infeed of said liquid means for reducing turbulence in said liquid near said orifices and means for diverting the stream from one of said orifices for measurement.

4. An apparatus for measurement of a flowing liquid by dividing said liquid into a plurality of substantially equal streams, measuring one of said streams and multiplying by the number of said streams which comprises a cylindrical vessel, a plurality of like circular orifices in the level bottom thereof, said orifices equally spaced around the circumference of a single circle concentric with the wall of said vessel, means for maintaining equality of gravity and velocity head of said liquid upon said orifices means for reducing turbulence in said liquid near said orifices and means for diverting the stream from one of said orifices for measurement.

5. An apparatus for measurement of a flowing liquid by separating out a portion of said liquid bearing a known constant ratio to the whole body of liquid, measuring the same and multiplying by the known ratio which comprises a cylindrical vessel, a plurality of like circular orifices in the bottom thereof, said orifices equally spaced around the circumference of a single circle concentric with the wall of said vessel, means for ensuring equality of gravity and velocity head of said liquid upon said orifices means for reducing turbulence in said liquid near said orifices, and means for diverting the stream from a part of said orifices for measuring.

6. An apparatus for separating out a proportion of a flowing liquid for measurement comprising a plurality of like circular orifices, means for maintaining equality of head of said liquid upon said orifices, means for preventing swirls in the liquid approaching said orifices and means for diverting the stream from one of said orifices for measuring.

7. An apparatus for separating out a constant predetermined proportion of a variable flowing liquid comprising a plurality of like circular orifices arranged in the level bottom of a circular vessel and concentric with the wall thereof and with the point of inflow of said liquid, means for maintaining a head of said liquid upon said orifices and means for diverting the stream from one of said orifices for measuring, in combination with swirl damping ribs above said orifices.

8. An apparatus for separating out a constant proportion of a variable flowing liquid comprising a plurality of like circular orifices arranged in the level bottom of a circular vessel and concentric with the wall thereof and with the point of inflow of said liquid, means for maintaining a head of said liquid upon said orifices and means for diverting the stream from one of said orifices for measuring, in combination with a baffle in the form of an inverted cone beneath the point of inflow of said liquid, whereby the inflowing stream is deflected upward and entrained air given time to rise to the surface of the liquid before the flow passes over the rim of said baffle to said orifices.

KENNETH E. STUART.